United States Patent [19]
Gilles

[11] 3,862,942
[45] Jan. 28, 1975

[54] PREPARATION OF 2,4,6-TRIS(HYDROXYBENZYLTHIO)TRIAZINES

[75] Inventor: Jack C. Gilles, Cleveland, Ohio

[73] Assignee: The B. F. Goodrich Company, Akron, Ohio

[22] Filed: Nov. 14, 1973

[21] Appl. No.: 415,505

Related U.S. Application Data

[63] Continuation-in-part of Ser. No. 191,492, Oct. 21, 1971, abandoned.

[52] U.S. Cl...... 260/248 CS, 260/45.8 N, 252/402, 426/182, 426/228
[51] Int. Cl............................................. C07d 55/50
[58] Field of Search ............................. 260/248 CS

[56] References Cited
UNITED STATES PATENTS

| | | | |
|---|---|---|---|
| 3,268,474 | 8/1966 | Hardy et al. | 260/248 X |
| 3,723,428 | 3/1973 | Song | 260/248 |

*Primary Examiner*—John M. Ford
*Attorney, Agent, or Firm*—J. Hughes Powell, Jr.

[57] ABSTRACT

2,4,6-Tris(hydroxybenzylthio)triazines are prepared by reacting together trithiocyanuric acid, formaldehyde, and a hydroxyl benzene compound in the presence of a hydrogen halide and water, and in an organic acid as a solvent. Compounds made using a hindered phenol as the hydroxyl benzene component have particular utility as antioxidants for polymers and other high molecular weight materials.

6 Claims, No Drawings

PREPARATION OF 2,4,6-TRIS(HYDROXYBENZYLTHIO)TRIAZINES

CROSS REFERENCE TO RELATED APPLICATION

This application is a Continuation-in-Part of application Ser. No. 191,492 filed on Oct. 21, 1971, now abandoned.

BACKGROUND OF THE INVENTION

Antioxidants based on hindered phenol derivatives of triazine, aminotriazines, cyanuric acid, and thiocyanuric acids are known. British Pat. No. 977,589 discloses compounds of the general formula

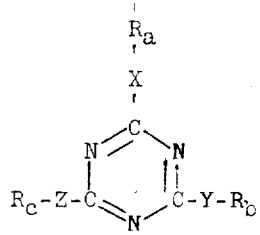

wherein X, Y, and Z are -S-, -O-, or

and $R_a$, $R_b$ and $R_c$ are alkyl groups containing 1 to 18 carbon atoms, cycloalkyl groups containing 5 or 6 carbon atoms in the ring, or aryl and alkaryl groups containing 6 to 24 carbon atoms. At least one of the R groups, and up to three, is a hydroxyl aryl or alkaryl group. Of the many compounds disclosed, particular reference is made to the compound

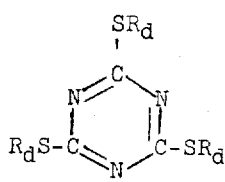

wherein $R_d$ is 3,5-di-tert-butyl-4-hydroxybenzyl. The compound was prepared in a two-step process wherein first 3,5-di-tertbutyl-4-hydroxybenzyl chloride was prepared, and this material then reacted in the second step with trisodium trithiocyanurate. The yield of the compound was 15.4% based upon the weight of the reactants in the second step.

SUMMARY OF THE INVENTION 2,4,6-Tris(hydroxybenzylthio)triazines are prepared in high yields in a one-step process comprising reacting together trithiocyanuric acid, formaldehyde, and a hydroxybenzene compound in the presence of a hydrogen halide and water, and in an organic acid as a solvent.

DETAILED DESCRIPTION

The process of this invention is directed to the preparation of 2,4,6-tris(hydroxybenzylthio)triazines in general, and in particular to the hindered phenol derivatives of triazine. The trithiocyanuric acid can be obtained by a number of known processes. The formaldehyde can be used in the form of formalin, paraformaldehyde, or other forms. In the novel process, a quantitative 3 moles of formaldehyde to 1 mole of trithiocyanuric acid can be used, but it is preferred to use a molar excess of formaldehyde based on the moles of trithiocyanuric acid used. Excellent results are obtained when employing about a 10 to about a 50 percent molar excess of formaldehyde, though higher amounts may be used.

The hydroxybenzyl compound used has the formula

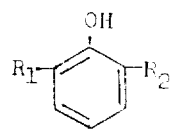

wherein $R_1$ and $R_2$ independently are hydrogen, an alkyl group containing 1 to 24 carbon atoms, a cyanoalkyl group containing 2 to 10 carbon atoms, or an alkoxy or an alkylalkoxy group containing a total of 1 to 10 carbon atoms in the group. The alkyl group may be linear or branched, i.e., can contain primary, secondary or tertiary carbon structures. Examples of such compounds are phenol, 2-methyl phenol, 2-n-butyl phenol, 2-tertiary butyl phenol, 2-n-pentyl phenol, ortho-2-ethylhexyl phenol, 2-dodecyl phenol, 2-octadecyl phenol, and the like; 2,6-dimethyl phenol, 2,6-di-tert-butyl phenol, 2-methyl-6-hexyl phenol, 2-ethyl-6-octyl phenol, 2,6-tetradecyl phenol, and the like; 2-cyanoethyl phenol, 2-cyanohexyl phenol, and the like; and 2,6-cyanoethyl phenol, and the like; 2-ethyl-6-cyanoethyl phenol, and the like; 2-methoxy phenol, 2,6-ethoxy phenol, 2-ethoxy-6-butoxy phenol, and the like, and 2-methoxy ethyl phenol, 2,6-ethoxyethyl phenol, and the like.

Preferred are the compounds wherein at least one of $R_1$ and $R_2$ is an alkyl group containing 1 to 24 carbon atoms. Such compounds are commonly known as hindered phenols. More preferred are those compounds wherein both $R_1$ and $R_2$ are alkyl groups, and most preferred are those wherein the alkyl groups are of branched structure containing from about 4 to about 12 carbon atoms. In the process, a quantitative 3 moles of hydroxybenzene to 1 mole of trithiocyanuric acid can be used, but it is preferred to use a molar excess of hydroxybenzene. Excellent results are obtained when about a 5 to about a 50 percent molar excess of hydroxybenzene is used, though higher amounts may be used.

The three components are reacted together in the presence of a hydrogen halide and water, and in an organic acid as a solvent. Preferred hydrogen halides are hydrogen chloride and hydrogen bromide, and more preferred are hydrochloric acid and hydrobromic acid. The hydrogen halide or the acid thereof is used in amounts from about 2 moles to about 10 moles of hydrogen halide per 1 mole of trithiocyanuric acid used. Use of over 10 moles of hydrogen halide is not necessary to obtain a quick, efficient reaction. Excellent results are obtained when using concentrated hydrochloric acid at about 6 moles of hydrogen chloride per 1 mole of trithiocyanuric acid. If the hydrogen halide is used as an aqueous solution of the hydrogen halide (i.e., as concentrated hydrochloric acid for example), no additional water need be added to the reaction.

The one-step reaction is conducted in an organic acid as a solvent. It was unexpectedly found that the use of an organic acid as a solvent is critical to the one-step process. When other well known solvents were employed, no product was obtained.

The organic acid is used in from about 100 parts to about 1000 parts by weight per 100 parts by weight of the total weight of the hydroxybenzene compound, the trithiocyanuric acid, and the formaldehyde. Use of over 1,000 parts by weight of solvent per 100 parts of reactants is not necessary to obtain the results of the invention. Use of about 500 parts by weight of organic acid per 100 parts by weight of the reactants provides excellent results.

Examples of the organic acids are the aliphatic acids such as formic acid, acetic acid, propionic acid, butyric acid, isobutyric acid, valeric acid, caproic acid, and the like, and halogenated aliphatic acids such as chloroacetic acid, fluoroacetic acid, dichloroacetic acid, and the like. Excellent results are achieved using low molecular weight aliphatic acids such as formic acid and acetic acid.

If the organic acid is used as an aqueous solution of the organic acid (i.e., as, for example, a 90 percent by weight solution of formic acid in water), no additional water need be added to the reaction.

If neither the hydrogen halide or the organic acid, or the formaldehyde, is employed as an aqueous solution, water must be added to the reaction. The level of water added is from about 10 parts to about 100 parts by weight of water per 100 parts by weight total of trithiocyanuric acid, formaldehyde, and hydroxybenzene compound. Use of over 100 parts by weight of water is not needed to achieve a quick, efficient reaction. Use of about 50 parts by weight of water per 100 parts by weight of the reactants provides excellent results.

The temperature range of the reaction is from about 0°C. to about 100°C., whereas a more preferred range is from about 20°C. to about 80°C. Higher temperatures adversely affect the yield. Yield is also adversely affected by long reaction times at high temperatures. Typical reaction times are from about 1 hour at 60°C. to about 5 hours at 20°C.

Although all of the ingredients can be charged at once to the reactor vessel, a preferred method is to premix the trithiocyanuric acid, the formaldehyde, and the hydrogen halide with the organic acid solvent and water in the reactor vessel and then proportion the hydroxybenzene compound into the reaction. It is preferred to run the reaction in an inert atmosphere such as under nitrogen.

The product is isolated from the reaction mixture by filtration. The 2,4,6-tris(3,5-di-tert-butyl-4-hydroxybenzylthio)triazine, a solid at room temperature, can be purified by washing it in cold methanol, ethanol and/or water, or by recrystallizing it from a solution of hot ethanol. The product can be characterized by infrared spectrum, melting point analysis, and Nuclear Magnetic Resonance (NMR).

The 2,4,6-tris(3,5-di-tert-butyl-4-hydroxybenzylthio) triazines have utility as antioxidants for polymers and other high molecular weight compounds which are subject to oxidation. Examples of such polymers and compounds are the polyolefins such as polyethylene, polypropylene, poly-1-butene, ethylenepropylene polymers, and the like; dienic polymers such as styrene-butadiene polymers, ethylene-propylene-diene polymers, polyisoprene, polybutadiene, and the like; fats and waxes such as lard, tallow, and other glycerides and beeswax, carnauba wax, and the like; drying oils such as linseed oil, tung oil, sardine oil, and the like; and like compounds.

The tris(hindered hydroxybenzylthio)triazines are used in amounts from about 0.01 parts to about 5 parts by weight based upon 100 parts by weight of the polymer. The compounds can be used alone or may be used in combination with other known antioxidants such as aromatic hindered phenol types or the sulfur-containing antioxidants such as dilauryl thiodipropionate.

The following Examples serve to more fully illustrate the invention.

EXAMPLE I 2,4,6-Tris(3,5-di-tert-butyl-4-hydroxybenzylthio) triazine was prepared using the following recipe:

| | |
|---|---|
| Trithiocyanuric acid, moles | 0.05 |
| Formalin, moles[a] | 0.15 |
| 2,6-di-t-butyl phenol, moles | 0.165 |
| Concentrated hydrochloric acid, moles[b] | 0.17 |
| Glacial acetic acid, milliliters | 100 |

[a] moles of formaldehyde charged. Formalin being composed of 37% by wt formaldehyde, 6-15% by wt. methanol, the rest being water.
[b] moles of HCl charged, the acid being about 31% by wt. of hydrogen chloride in water 8.9 grams of trithiocyanuric acid, 12.5 grams of formalin (containing 6.9 grams of water), 34.0 grams of 2,6-di-t-butyl phenol, and 17.5 milliliters of hydrochloric acid (containing 14 grams of water) were batch charged with the acetic acid to a reactor vessel equipped with stirrer, condenser and thermometer. The solution was heated to 65°C. and stirred while under a nitrogen purge for 40 minutes. The reaction mixture was cooled and the product filtered off and washed with ethanol. The weight recovered was 33.7 grams for a product yield of 81 percent. The melting point of the compound was 195° to 197°C.

EXAMPLE II 2,4,6-Tris(3,5-di-tert-butyl-4-hydroxybenzylthio) triazine was prepared using the following recipe:

| | |
|---|---|
| Trithiocyanuric acid, moles | 0.05 |
| Paraformaldehyde[1], moles | 0.3 |
| 2,6-di-t-butyl phenol, moles | 0.15 |
| Concentrated hydrochloric acid, moles | 0.35 |
| Glacial acetic acid, milliliters | 200 |

[1] formula $(CH_2O)_x$ 8.9 grams of trithiocyanuric acid, 9.0 grams of paraformaldehyde, and 35 milliliters of concentrated hydrochloric acid (containing 28 grams of water) along with 180 milliliters of acetic acid, were charged to the reactor vessel. Solution was agitated and heated to 53°C. 32.6 grams of 2,6-di-t-butyl phenol was dissolved in 20 milliliters of acetic acid. This solution was then slowly proportioned to the reactor solution over a period of 1.5 hours, followed by an additional 0.5 hours. The reaction mixture was then cooled and the compound filtered out. The compound was washed with 1000 milliliters of water, filtered and dried. 35.5 grams of compound was recovered reflecting an 86 percent yield. The material was then rewashed with ethanol, filtered, and redried to yield yellow-white crystals having a melting point of 197°-198°C.

EXAMPLE III

The reaction in Example II was essentially repeated at a lower temperature, 30°-32°C. The recipe used was

| Trithiocyanuric acid, moles | 0.05 |
| Paraformaldehyde, moles | 0.225 |
| 2,6-di-t-butyl phenol, moles | 0.165 |
| Concentrated hydrochloric acid, moles | 0.3 |
| Glacial acetic acid, milliliters | 200 |

8.9 grams of trithiocyanuric acid, 6.8 grams of paraformaldehyde, 30 milliliters of concentrated hydrochloric acid (containing 24 grams of water) and 190 milliliters of acetic acid were charged to the reactor vessel. 35 grams of 2,6-di-t-butyl phenol in 10 milliliters of acetic acid were slowly proportioned into the reactor solution over a period of 1.25 hours. The reactor solution was then stirred an additional 3.75 hours. The contents were a thick, white slurry. 100 milliliters of methanol were added, the solids filtered out and dried. 39 grams of material was recovered reflecting a yield of 94 percent. The compound was characterized by IR spectrum. The melting point of the compound was 197°–198°C.

Although the first three examples are directed to the preparation of 2,4,6-tris(3,5-di-tert-butyl-4-hydroxybenzylthio)-s-triazine, the procedures can be used to prepare 2,4,6-tris(hydroxybenzylthio)triazines in general. The selection of the type(s) of hydroxybenzene compound determines the triazine derivative prepared. For example, if 2-tertiary butyl phenol was used, the compound would be 2,4,6-tris(3-t-butyl-4-hydroxybenzylthio)-s-triazine.

EXAMPLE IV

Following the procedure of Example II, 8.9 grams (0.05 mole) of trithiocyanuric acid, 9.0 grams (0.3 mole) of paraformaldehyde, and 35 milliliters of concentrated hydrochloric acid (0.35 mole) were added to 200 milliliters of aqueous formic acid (90 percent by weight formic acid), and the solution added to a reactor vessel. The solution was agitated and heated to 45°C. 32.6 grams of 2,6-di-t-butyl phenol, dissolved in 25 milliliters of aqueous formic acid, was added slowly to the reactor solution over a period of two hours. Temperature was maintained at 42° ± 2°C. The reactor solution was stirred an additional three hours, during which the solution thickened and a white precipitate formed. The total reaction time was about 5 hours. The precipitate was filtered out of the mixture, washed thoroughly with water, and dried. The material was then recrystallized from ethanol to yield 25 grams of a crystalline solid having a melting point of 196°–198°C. The IR spectrum was consistent with that of the desired product, 2,4,6-tris(3,5-di-t-butyl-4-hydroxybenzylthio)-s-triazine.

EXAMPLE V

A series of experiments were run to demonstrate the criticality of the use of an organic acid as the solvent for the one-step process of the invention. Prior art processes consist of two steps wherein a hydroxybenzyl chloride is first prepared and isolated, which product is then reacted with usually a trithiocyanurate salt. A prior art two-step process is exemplified in Example 9 of British Pat. No. 977,589.

The reactions were run following the batch process procedure of Example I. The recipes and results obtained are as follows:

| Sample | 1 | 2 | 3 | 4 | 5 | 6 | 7 | 8 | 9 |
|---|---|---|---|---|---|---|---|---|---|
| Trithiocyanuric Acid, grams | 8.9 | 8.9 | 8.9 | 1.8 | 1.8 | 1.8 | 1.8 | 1.8 | 17.7 |
| Formaldehyde, grams | 5[a] | 5[a] | 5[a] | 0.9[b] | 0.9[b] | 0.9[b] | 0.9[b] | 0.9[b] | 9[c] |
| 2,6-di-t-butyl phenol, grams | 34 | 34 | 34 | 6.8 | 6.8 | 6.8 | 6.8 | 6.8 | 68 |
| Concentrated hydrochloric acid, milliliter | 50 | 51 | 50 | 3.5 | 3.5 | 3.5 | 3.5 | 3.5 | 3.5 |
| Dimethyl sulfoxide, ml. | 150 | — | — | — | — | — | — | — | — |
| Ethyl alcohol, ml. | — | 150 | — | — | — | — | — | — | — |
| Dimethyl formamide, ml. | — | — | 150 | — | — | — | — | — | — |
| Dioxane, mls. | — | — | — | 50 | — | — | — | — | — |
| Tetrahydrofuran, mls. | — | — | — | — | 50 | — | — | — | — |
| Nitromethane, mls. | — | — | — | — | — | 50 | — | — | — |
| Diglyme (dimethyl ether of ethylene glycol) mls. | — | — | — | — | — | — | 50 | — | — |
| Acetic acid, mls. | — | — | — | — | — | — | — | 50 | 200 |
| Temperature, °C. | 85 | 78[a] | 95 | 60 | 60 | 60 | 60 | 60 | 60 |
| Time, hours | 1.5 | 24 | 4 | 2.5 | 2.5 | 2.5 | 2.5 | 2.5 | 3.5 |
| Product Obtained: | none | none | none | none | none | none | none | yes | yes |

[a] 13.9 milliliters of a 35% by weight solution of formaldehyde in water
[b] 2.5 grams of a 37% by weight solution of formaldehyde in water
[c] 25 grams of a 37% by weight solution of formaldehyde in water No 2,4,6-tris(4-hydroxy-3,5-di-t-butylbenzylthio)-triazine was prepared in Samples 1 to 7. Only unreacted starting materials or by-products other than the desired product were recovered. In Samples 8 and 9, where an organic acid (i.e., acetic acid) was used as the solvent, product was obtained. The yield in Sample 9, after recrystallization, was 60 percent by weight based upon the amount of trithiocyanuric acid charged.

EXAMPLE VI

The 2,4,6-tris(3,5-di-tert-butyl-4-hydroxybenzylthio)-s-triazine prepared in the above examples was evaluated as an antioxidant in polypropylene. The polypropylene used is sold commercially as Profax 6501 (Hercules). The antioxidant compounds were admixed with the polypropylene (PP) by dissolving the compound(s) in benzene, adding the solution to a slurry of PP in benzene, and evaporating off the benzene. The PP was then extruded at 220°C., cut into strips and molded at 220°C. into 25–30 mil sheets. Test samples were 1 × 2 inch strips cut from the sheets. Testing consisted of mounting the strips in a circulating air oven at 140°C. and periodically checking them for visual signs of crazing. The time to initial crazing is cited as the time to failure of the antioxidant.

The 2,4,6-tris(3,5-di-tert-butyl-4-hydroxybenzylthio)-s-triazine was evaluated alone at different levels and in combination with another hindered phenol and a sulfur-containing antioxidant. The results are shown in the following table:

| | pph[4] | pph Phenol[2] | pph[3] DSTDP | Hours at 140°C |
|---|---|---|---|---|
| Triazine[1] | 0.01 | — | — | 48 |
| do. | 0.05 | — | — | 144 |
| do. | 0.10 | — | — | 360 |
| do. | 0.15 | — | — | 1356 |
| do. | 0.25 | — | — | 1500 |
| do. | 0.50 | — | — | 2850 |
| do. | 0.25 | 0.25 | — | 4000 |
| do. | 0.10 | — | 0.25 | 1540 |
| do. | 0.25 | — | 0.25 | 3300 |
| do. | 0.50 | — | 0.25 | 4450 |

[1] 2,4,6-tris(3,5-di-tert-butyl-4-hydroxybenzylthio)-s-triazine
[2] 1,3,5-tris(3,5-di-tert-butyl-4-hydroxybenzyl)-isocyanurate
[3] distearylthiodipropionate
[4] parts by weight per hundred parts by weight of polypropylene The results show that the compounds prepared in this invention are useful antioxidants for polyolefins. They are especially effective when used in combination with other known antioxidants. Other hydroxybenzyl triazines that are prepared by this process are similarly useful as antioxidants.

I claim:

1. A process for preparing 2,4,6-tris(4-hydroxybenzylthio)triazines comprising reacting together trithiocyanuric acid, formaldehyde, and a 1-hydroxybenzene of the formula

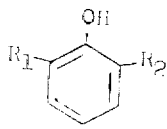

wherein $R_1$ and $R_2$ are selected from the group consisting of hydrogen, an alkyl group containing 1 to 24 carbon atoms, a cyanoalkyl group containing 2 to 10 carbon atoms in the group, and an alkoxy group or an alkylalkoxy group containing 1 to 10 carbon atoms in the group, said reaction being conducted in the presence of a hydrogen halide and water, and in an organic acid as a solvent.

2. A process of claim 1 wherein the $R_1$ and $R_2$ of the 1-hydroxybenzene are alkyl groups containing 1 to 24 carbon atoms, and the hydrogen halide is selected from hydrochloric acid and hydrobromic acid.

3. A process of claim 2 wherein $R_1$ and $R_2$ are alkyl groups containing 4 to 12 carbon atoms.

4. A process of claim 3 wherein $R_1$ and $R_2$ are ditertbutyl, and the hydrogen halide is concentrated hydrochloric acid.

5. A process of claim 4 wherein the organic acid solvent is an aliphatic or halogenated aliphatic organic acid.

6. A process of claim 5 wherein the organic acid is glacial acetic acid.

* * * * *

UNITED STATES PATENT OFFICE
CERTIFICATE OF CORRECTION

PATENT NO. : 3,862,942
DATED : January 28, 1975
INVENTOR(S) : Jack C. Gilles

It is certified that error appears in the above-identified patent and that said Letters Patent are hereby corrected as shown below:

In column 2, line 35, "Sucn" should read --Such--. In the table bridging columns 5 and 6, add at the bottom of the table --d boiling point at reflux-- and --e 31% by weight in water--.

Signed and Sealed this ninth Day of September 1975

[SEAL]

Attest:

RUTH C. MASON
Attesting Officer

C. MARSHALL DANN
Commissioner of Patents and Trademarks